United States Patent [19]

Marek et al.

[11] 4,239,541
[45] Dec. 16, 1980

[54] MILDEW SEALING COATING COMPOSITION AND METHOD OF USING

[75] Inventors: Emanuel F. Marek, Wonder Lake; Alex H. Migdal, Hoffman Estates, both of Ill.

[73] Assignee: DeSoto, Inc., Des Plaines, Ill.

[21] Appl. No.: 920,342

[22] Filed: Jun. 29, 1978

[51] Int. Cl.$^2$ .............................................. C09D 5/14
[52] U.S. Cl. ................................. 106/15.05; 252/106; 106/18.33; 106/18.34; 260/29.6 R; 428/907; 427/374.1; 427/407.1; 427/419.2; 427/419.3; 427/419.1; 427/385.5
[58] Field of Search .......... 427/419 R, 419 D, 419 A, 427/407 R, 376 A, 375, 385, 374 R; 428/907; 424/81, 127, 157; 106/15 R, 15.05; 260/29.6 R

[56] References Cited

U.S. PATENT DOCUMENTS

| | | | |
|---|---|---|---|
| 2,517,580 | 8/1950 | Lewis | 106/15 R |
| 3,523,121 | 8/1970 | Lewis et al. | 106/15 R |
| 3,585,022 | 6/1971 | Gray | 71/65 |
| 3,761,488 | 9/1973 | Lewis et al. | 424/267 |
| 3,953,643 | 4/1976 | Cheung et al. | 427/407 R |

OTHER PUBLICATIONS

Ellis, Printing Inks, C.3, 1940, p. 349.
Chemical Abstracts, vol. 84, 1976, Hayashi et al., p. 61387n.

*Primary Examiner*—Ronald H. Smith
*Assistant Examiner*—S. L. Childs
*Attorney, Agent, or Firm*—Dressler, Goldsmith, Shore, Sutker & Milnamow, Ltd.

[57] ABSTRACT

Diaphanous mildew sealing, coating compositions are disclosed which are comprised of water containing emulsified latex particles which coalesce into a film at room temperature. A mildewcidal agent is included in an amount sufficient to kill mildew contacted by the compositions and a nonvolatile, relatively insoluble alkaline oxide or hydroxide compound is also included in a weight percent range of about 0.006 to about 0.03 times its equivalent weight. These compositions are scrubbed onto mildew infected surfaces so that the mildew colonies are dislodged and entrapped within the coatings which are formed when the compositions dry. The dried coatings containing the dislodged mildew colonies are then painted to provide a decorative surface which better resists mildew formation.

4 Claims, No Drawings

MILDEW SEALING COATING COMPOSITION AND METHOD OF USING

DESCRIPTION

1. Technical Field

Mildew if a fungus that often infects surfaces subject to dampness. Such infections are particularly abundant in basement areas, in bathrooms and generally in homes situated in warm, damp climates. Once the infection has begun, it is particularly difficult to retard or eradicate.

2. Background Art

Before a mildew infected surface can be painted, it must be cleaned of as much mildew as possible so that the fresh paint has a surface to which it can adhere. Mildew cleaning washes have been developed which are first applied to the surface to be pained and then removed, thereby removing much of the mildew. A problem with such washes, however, is that the washed areas frequently grow mildew faster than do the unwashed areas of the same surfaces.

An object of this invention is to provide an essentially mildew free paintable surface for an area infected with mildew which does not require both application and removal steps. Another object of this invention is to provide such a paintable surface which will not hasten mildew growth but retard it and furthermore kill much of the mildew that was originally present.

DISCLOSURE OF INVENTION

In accordance with this invention diaphanous mildew sealing, coating compositions are formulated which are comprised of water containing emulsified latex particles which will coalesce into a film at room temperature. Mixed into these compositions are an alkaline-stable mildewcidal agent in an amount sufficient to kill mildew contacted by the compositions and a nonvolatile, relatively insoluble, alkaline earth oxide or hydroxide compound present in a weight precent range of about 0.006 to about 0.03 times its equivalent weight.

Compositions of this invention are preferably applied to the mildew infected area by scrubbing, which dislodges the mildew colonies and entraps these colonies within the applied coating. The mildewcide present in the composition kills those organisms with which the composition comes in contact, but the mildewcide leaches away and becomes ineffective with time. The relatively insoluble alkaline earth oxide or hydroxide provides a mildew resistant alkaline environment which extends the period of protection. The coalescable latex particles coalesce to form a sealing film which can be overpainted on drying.

DESCRIPTION OF PREFERRED EMBODIMENTS

The emulsified coalescable latex particles of this invention are comprised of emulsified resin particles typical of those used in making water based latex paints. These resins are typically acrylic polymers which are usually blends of two or more different monoethylenically unsaturated monomers. These latex particles have a low glass transition temperature so as to coalesce in air to form a film at room temperature, and they are not appreciably degraded by the alkaline environment established within the coatings by the presence of the particles of alkaline earth oxide or hydroxide. Many suitable polymers are known in the art and some typical polymers are disclosed in U.S. Pat. Nos. 3,350,339; 3,356,653; 3,356,654; 3,356,655 and 3,470,126.

The monomers which comprise these preferred polymers are chosen mainly from two groups, those which form polymers whose coalesced films are hard at room temperature, and those whose coalesced films are soft. Examples from the first, or hard group include, but are not limited to, methyl methacrylate, styrene, vinyl toluene, vinyl acetate, vinyl chloride and the like. Examples from the soft group include, but are not limited to, $C_1$-$C_8$ acrylate esters, such as ethyl acrylate, isobutyl acrylate and 2-ethylhexyl acrylate, as well as the $C_1$-$C_8$ methacrylate esters, (other than methyl methacrylate) such as propyl methacrylate and butyl methacrylate. Additionally, emulsion copolymers of ethylene and vinyl acetate, wherein ethylene comprises about 5 to about 40 weight percent, will produce the desired coalescable films.

The emulsion polymers used in this invention form films which will coalesce in air at room temperatures and thus commonly have glass transition temperatures below about 20° C., preferably from about 10° C. to about −10+ C. Other ingredients, such as small amounts of high boiling water immiscible solvents such as 2-butoxy ethanol acetate, may be added to emulsion systems of the polymers having higher glass transition temperatures, as taught in U.S. Pat. No. 3,032,521, to enable drying to form a film at room temperature. Water miscible solvents, such as 2-ethoxy ethanol can also be used in small amounts for freeze-thaw resistance and to aid application properties.

Various reactive monomers may also be present in these emulsion systems as taught in the patents listed previously. Monoethylenically unsaturated carboxylic acids such as acrylic, methacrylic, maleic, or crotonic acids are frequently present in amounts of about 0.5 to about 3 weight percent to aid adhesion and emulsion stability.

The emulsions used in this invention also usually contain a volatile base, normally ammonium hydroxide, or other volatile amine, such as methylamine, diethanol amine, triethyl amine, and the like.

The preferred emulsions contain about 40 to about 60 weight percent of the emulsified polymer particles, and preferably about 45 to about 55 weight percent. These proportions are normal for latex paints.

The mildewcide present in the embodiments of this invention are preferably selected to remain active in the alkaline environment established in the dried coatings which are formed. Mildewcides which are effective in an alkaline environment are themselves well known.

Several appropriate mildewcidal agents are available, and selection of the mildewcide is not a feature of this invention. Thus, U.S. Pat. Nos. 3,523,121 and 3,761,488 disclose the use of 3-isothiazolones as mildewcides and their use in acrylic, water-based paints; and application Ser. No. 389,745 filed Aug. 20, 1973 and now abandoned, discloses compositions containing 3-isothiazolones in the pH range of 6.0 to 9.2. We have found 3,5-dimethyltetrahydro-1,3,5,2H-thiadiazine-2-thione to be stable in the alkaline environment employed herein and also to be effective in killing mildew fungi in that alkaline environment.

The amount of mildewcide present in the compositions of this invention will vary with the mildewcide chosen. The amount needed for any particular mildewcide is of course that amount which is effective. We have found that for 3,5-dimethyltetrahydro-1,3,5,2H- thiadiazine-2-thione, at least about 1 percent by weight can be effective, while preferably, about 3 to about 4 weight percent is used.

A substantially permanent alkaline environment is provided in the coatings which are formed by the non-volatile relatively insoluble alkaline earth oxides or hydroxides. These are the oxides or hyroxides of magnesium, calcium, barium and strontium, preferably barium and strontium which form stronger bases.

By being relatively insoluble and nonvolatile, these oxides or hydroxides cause the coating formed on the surface to contain particles having a moderate alkaline reaction. The alkali metals are more strongly alkaline and more soluble and injure the coated substrate and the brushes used, and also are a hazard to the painter. Other oxides or hydroxides are less alkaline and less useful than those used herein. While some leaching takes place, the limited solubility of the selected compounds allows them to maintain a desired alkaline environment for several years. Barium is particularly preferred.

It will also be understood that the sealing coatings of this invention are topcoated, as with a pigmented paint, to provide a decorative surface. This limits leaching and it also causes the mildewcide and the alkaline earth metal compound to become available on the exposed surface of the topcoat for a prolonged period.

The amount of the alkaline earth oxide or hydroxide is conveniently expressed as a weight percent within the range from about 0.006 times the equivalent weight of the compound to about 0.03 times the equivalent weight of the compound. For example, when the compound is barium hydroxide octahydrate [$Ba(OH)_2.8H_2O$] with a molecular weight of 315.5 and an equivalent weight of 157.75, the amount used would be from about 1 percent to about 5 percent by weight.

We have found that the most effective means of applying the latex compositions of this invention is by means of a relatively stiff bristled brush. This brush is first dipped into the composition, and then the composition is applied to the surface to be painted with a scrubbing rather than a painting action. In so applying the composition, the stiff bristles are worked into the mildew infected surface to dislodge the mildew colonies. This dislodged mildew is thus incorporated into the alkaline, mildewcide-containing sealing coating which is formed where it is killed or its growth severely retarded. That mildew not dislodged, but nonetheless on the outside of the scrubbed surface, is also contacted by the alkaline, mildewcide-containing composition which kills it or retards its growth. The areas of the surface not containing mildew are similarly coated and thereby protected from infection or mildew infestation by the compositions of this invention. On drying, the latex particles coalesce into a film, and the dislodged mildew is sealed within the alkaline environment of the composition.

The drying time for the compositions of this invention is substantially the same as that for a conventional aqueous latex paint. Thus, the embodiments of this invention will usually be dry to the touch in a few minutes, and may usually be painted over with the desired color coat shortly thereafter or later, if desired.

The embodiments of this invention contain no pigments or coloring agents other than the mildewcide and the finely divided alkaline oxide or hydroxide which are themselves usually white. Thus, the dry sealing, coating compositions will be substantially clear or transluscent, generically termed diaphonous. This is because the finely divided alkaline oxide or hydroxide particles are not present in large enough amounts to confer much opacity to the coating. These compositions, when dry, are normally painted over as the entrapped, dark colored mildew does not provide an attractive appearance.

The present invention is illustrated by, but not limited to, the following example.

BEST MODE FOR CARRYING OUT THE INVENTION

Example

Basic Mildew Sealing, Coating Composition

|  | Weight Percent |
|---|---|
| $H_2O$ (deionized) | 47.6 |
| Acrylic emulsion polymer[1] | 47.6 |
| $Ba(OH)_2 . 8H_2O$ | 1.1 |
| Mildewcide[2] | 37.1 |
|  | 100.0 |

[1]The polymer composition used in this example is prepared as described in Example 5 of U.S. Pat. No. 3,356,654.
[2]3,5-dimethyltetrahydro-1,3,5,2H-thiadiazine-2-thione

INDUSTRIAL APPLICABILITY

The aqueous latex composition of this example is scrubbed onto a test surface infected with mildew. After drying, the mildew-containing sealing coating is painted over with an ordinary latex paint. The overpainted sealed surface resists mildew formation better than if an anit-mildew was followed by rinsing is used to precede overpainting with the same paint.

We claim:

1. A diaphanous mildew sealing, coating composition comprising water containing latex particles coalescable into a film at room temperature emulsified therein, an alkaline-stable mildewcidal agent present in an amount sufficient to kill mildew contacted by the composition, and a nonvolatile, relatively insoluble, alkaline earth compound selected from the group consisting of the oxides and hydroxides of barium, said compound being present in a weight percent of about 0.006 to about 0.03 times its equivalent weight.

2. A diaphanous mildew sealing, coating composition as recited in claim 1 wherein said relatively insoluble alkaline compound is barium hydroxide octahydrate.

3. A diaphanous mildew sealing, coating composition as recited in any of claims 1 and 2 wherein the water contains about 40 to about 60 weight percent of said latex particles.

4. A method of sealing and coating a mildew infected surface which comprises scrubbing the composition of claim 1 onto a surface infected with mildew colonies to dislodge said mildew colonies from said surface, drying said composition to entrap said mildew colonies in a sealing coating of said composition, and overcoating said sealing coating with a layer of paint.

* * * * *